(12) United States Patent
Meissner et al.

(10) Patent No.: US 12,276,309 B2
(45) Date of Patent: Apr. 15, 2025

(54) DISC BRAKE FOR A UTILITY VEHICLE

(71) Applicant: KNORR-BREMSE Systeme fuer Nutzfahrzeuge GmbH, Munich (DE)

(72) Inventors: Bjoern Meissner, Munich (DE); Steffen Sommer, Dachau (DE); Martin Pleintinger, Eichendorf (DE); Stefan Wetterer, Munich (DE); Michael Peschel, Schoengeising (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 325 days.

(21) Appl. No.: 17/779,471

(22) PCT Filed: Nov. 10, 2020

(86) PCT No.: PCT/EP2020/081679
§ 371 (c)(1),
(2) Date: May 24, 2022

(87) PCT Pub. No.: WO2021/104857
PCT Pub. Date: Jun. 3, 2021

(65) Prior Publication Data
US 2022/0412414 A1 Dec. 29, 2022

(30) Foreign Application Priority Data
Nov. 25, 2019 (DE) ............ 10 2019 131 840.8

(51) Int. Cl.
*F16D 55/226* (2006.01)
*F16D 65/097* (2006.01)
*F16D 55/00* (2006.01)

(52) U.S. Cl.
CPC ....... *F16D 55/226* (2013.01); *F16D 65/0978* (2013.01); *F16D 2055/0029* (2013.01)

(58) Field of Classification Search
CPC ............... F16D 55/226; F16D 65/0978; F16D 2055/0029
(Continued)

(56) References Cited

U.S. PATENT DOCUMENTS

| 4,491,204 A | 1/1985 | Dirauf et al. |
| 5,538,103 A | 7/1996 | Rueckert et al. |

(Continued)

FOREIGN PATENT DOCUMENTS

| CN | 104271976 A | 1/2015 |
| CN | 107850145 A | 3/2018 |

(Continued)

OTHER PUBLICATIONS

International Preliminary Report on Patentability (PCT/IB/326 & PCT/IB/373) issued in PCT Application No. PCT/EP2020/081679 dated Jun. 9, 2022, including English translation of document C2 (German-language Written Opinion (PCT/ISA/237), filed on May 24, 2022 (eight (8) pages).

(Continued)

*Primary Examiner* — Christopher P Schwartz
(74) *Attorney, Agent, or Firm* — Crowell & Moring LLP

(57) ABSTRACT

A disc brake for a utility vehicle includes brake caliper which straddles a brake disc, two brake pads each arranged in a pad channel of a vehicle-side brake carrier. The brake pads are retained in the disk brake under prestress by a pad retaining spring and a pad retaining clip on the brake caliper which spans a opening of the brake caliper. The disc brake further includes a restoring device configured to bias the brake pads away from one another after having been displaced during brake actuation. The restoring device includes sprung spreader elements that engage the opposite brake pads. The sprung spreader elements preferably include V-shaped spreader elements which are supported in the (Continued)

connection region of their respective spring arms on the pad retaining clip, and retained via their ends on the opposing brake pads.

16 Claims, 11 Drawing Sheets

(58) Field of Classification Search
USPC .......................................... 188/73.36–73.38
See application file for complete search history.

(56) References Cited

U.S. PATENT DOCUMENTS

| | | |
|---|---|---|
| 2014/0339026 A1 | 11/2014 | Gutelius et al. |
| 2015/0008079 A1 | 1/2015 | Eichler et al. |
| 2016/0003315 A1 | 1/2016 | Crippa et al. |
| 2016/0116009 A1 | 4/2016 | Falter et al. |
| 2018/0106308 A1 | 4/2018 | Fricke et al. |
| 2018/0223920 A1 | 8/2018 | Fricke et al. |
| 2018/0223921 A1* | 8/2018 | Krause ................ F16D 65/0974 |
| 2019/0056000 A1 | 2/2019 | Beyer et al. |
| 2019/0085917 A1 | 3/2019 | Fischl et al. |
| 2019/0293133 A1* | 9/2019 | Brandl ................ F16D 65/0975 |

FOREIGN PATENT DOCUMENTS

| | | | |
|---|---|---|---|
| CN | 108350963 A | | 7/2018 |
| CN | 108779820 A | | 11/2018 |
| CN | 109328273 A | | 2/2019 |
| CN | 110199139 A | | 9/2019 |
| DE | 29 31 071 A1 | | 3/1981 |
| DE | 43 01 621 A1 | | 8/1993 |
| DE | 10 2011 118 736 A1 | | 5/2013 |
| DE | 10 2013 008 155 A1 | | 11/2014 |
| DE | 10 2016 004 516 A1 | | 10/2017 |
| DE | 10 2016 124 310 A1 | | 6/2018 |
| DE | 102017009295 A1 * | 4/2019 | ........... F16D 65/097 |
| DE | 10 2018 114 396 A1 | | 12/2019 |
| EP | 1 798 437 A1 | | 6/2007 |
| JP | 57-179435 A | | 11/1982 |
| JP | 2009-127715 A | | 6/2009 |
| KR | 10-2019-0096386 A | | 8/2019 |
| WO | WO 2016/097101 A1 | | 6/2016 |
| WO | WO 2016/202778 A1 | | 12/2016 |
| WO | WO 2018/077785 A1 | | 5/2018 |

OTHER PUBLICATIONS

Korean-language Office Action issued in Korean Application No. 10-2022-7019470 dated Apr. 18, 2024 with English translation (12 pages).

Chinese-language Office Action issued in Chinese Application No. 202080081454.X dated Apr. 24, 2023 with English translation (12 pages).

International Search Report (PCT/ISA/210) issued in PCT Application No. PCT/EP2020/081679 dated Dec. 16, 2020 with English translation (four (4) pages).

German-language Written Opinion (PCT/ISA/237) issued in PCT Application No. PCT/EP2020/081679 dated Dec. 16, 2020 (five (5) pages).

German-language Office Action issued in German Application No. 10 2019 131 840.8 dated Oct. 6, 2020 (10 pages).

* cited by examiner

DISC BRAKE FOR A UTILITY VEHICLE

BACKGROUND AND SUMMARY OF THE INVENTION

The invention relates to a disk brake for a utility vehicle in accordance with the preamble of claim 1.

In the functional case, that is to say in the event of a braking operation, an application of the brake linings of a sliding caliper disk brake of this type takes place by way of an application device, the application-side brake lining first of all being pressed against the brake disk and subsequently the opposite, reaction-side brake lining being pressed onto the brake disk.

The action-side brake lining is pressed here against the brake disk via brake plungers of the application device, whereas, in order to press on the reaction-side brake lining, the brake caliper which is configured as a sliding caliper is displaced counter to the application direction of the action-side brake lining. In the case of the known disk brake, the brake caliper remains in this last-mentioned position after releasing of the brake, in which position the brake linings, or at least the reaction-side brake lining, bear/bears against the brake disk admittedly without pressure, but in a rubbing manner.

The so-called residual rubbing torques which occur as a result during driving operation lead to an increased fuel consumption of the vehicle and likewise to a reduction in the service life both of the brake disk and of the brake linings.

Although a slight release of the brake linings takes place during the driving operation as a result of a wobble of the brake disk and as a result of vibrations and transverse accelerations when cornering, these effects are not sufficient to effectively prevent the so-called rubbing.

In order to solve this problem, WO 2016/202778 A1 proposes to provide a disk brake with sprung spreading elements which form a resetting device and by means of which the brake linings are reset actively after a braking operation has ended, that is to say are moved out of the action region of the vehicle-side brake disk. Here, each brake lining is assigned a spreading element, with in each case two spring arms which engage into the respective lining carrier plate.

These spreading elements are fastened to a retaining bracket which extends substantially parallel to the brake disk and is in turn held on a vehicle-side brake carrier. This construction prevents residual rubbing torques which lead to increased wear of the brake linings being produced.

Although this resetting device has proven itself in practice, it can be realized only with a relatively high manufacturing complexity, which is inconsistent with the constant demand for cost minimization.

DE 4301621 A has disclosed a disk brake with a stationary brake carrier which has two lining shafts for receiving the brake linings, each lining shaft being delimited in the two circumferential directions of the brake disk by way of brake carrier horns, on which a lining carrier plate, which supports a friction lining, of the respective brake lining is supported so as to slide in the application direction.

In order to reset the brake linings, a spring arrangement is provided which acts axially in the brake release direction on the brake linings and, after release of the brake, assists setting of the air gap between the brake linings and the brake disk.

This spring arrangement has two sprung spreading elements with in each case two spring arms which bear in a sprung manner against the lining carrier plate above the friction lining, the respective spreading element being fixed on a stationary component, for example on the brake carrier.

US 2014/033 9026 A1 describes a spreading element, comprising a locking arm which connects the spreading element to a brake lining, a retraction arm and a prestressing device which is arranged between the locking arm and the retraction arm. Here, the prestressing device has spiral spring loops which store energy during a braking operation and retract the brake lining after release of the braking operation.

In a difference from the generic type, this construction does not relate to a sliding caliper brake, but rather to a claw caliper brake which is used in a passenger vehicle, but is not suitable for a utility vehicle.

The invention is based on the object of developing a disk brake of the generic type in such a way that its resetting device is of simpler construction and therefore can be produced less expensively, and its operational reliability is improved.

This object is achieved by way of a disk brake having two V-shaped spreading elements which are supported on or fastened to the lining retaining bracket in the connecting region of their respective spring legs, with the spring legs of each spreading element being held at their ends on the brake linings.

In comparison with a disk brake according to the prior art, the embodiment according to the invention affords considerable advantages. These result, inter alia, from the extremely simple realization of the invention, since merely two, preferably single-piece spreading elements are provided. After release of the brake, the brake linings are displaced by way of the spring pressure of the spring legs which are stressed during braking into a position, in which they no longer bear against the brake disk.

In principle, the spreading elements can be formed from a spring wire and to this extent not only can be produced simply, but rather are also improved with regard to their service life. Precisely this is of particular significance, since disk brakes are subject as safety-relevant components to special requirements.

The V-shape of each spreading element makes it possible to use it in different brake linings which are to be installed and, to this end, have receiving possibilities for the ends of the spring legs at identical positions. In this way, tailoring of the spreading elements becomes possible, which considerably reduces their procurement costs.

The configuration according to the invention of the spreading elements in a V-shape is to be understood in the widest sense, each spreading element having spring legs which run at least in regions obliquely with respect to one another toward a common connecting region.

Here, at least one of the spring legs is designed in such a way that it is supported on an associated lining retaining spring of the corresponding brake lining, in order thus to avoid tilting in the direction of the brake disk, each connecting region bearing against the lower side of the lining retaining bracket.

An alternative design variant provides that each spreading element is fastened to the holding bracket in the connecting region of the spring legs, for example by way of clamping means.

Since the spreading elements run in a rising manner in the mutually facing direction, an upward movement of the connecting regions which results during the application of the brake linings is prevented by way of their contact with or connection to the lining retaining bracket.

In accordance with a further concept of the invention, the spreading elements are configured and mounted in an asymmetrical manner, with the result that, in the case of wear of the brake linings and the displacement due to this of the connecting regions of the spreading elements below the lining retaining bracket, they can slide past one another.

The fixing of the ends of the spring legs on the lining carrier plates can take place in different ways, for example by way of said ends being plugged into bores of the lining carrier plate or the lining retaining spring.

Further advantageous embodiments of the invention are characterized in the subclaims.

Other objects, advantages and novel features of the present invention will become apparent from the following detailed description of one or more preferred embodiments when considered in conjunction with the accompanying drawings.

DETAILED DESCRIPTION

Figure 1:
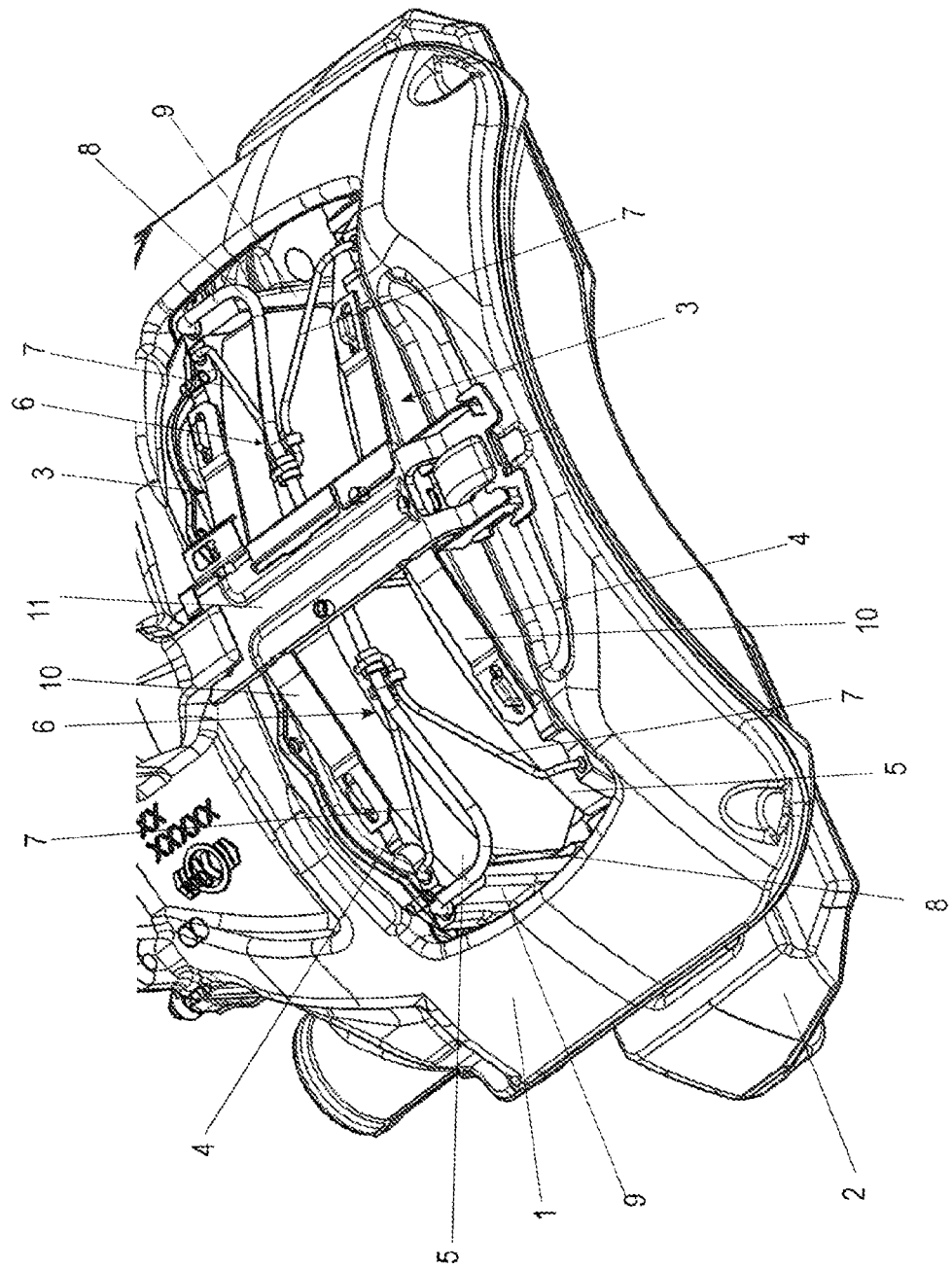
FIG. 1 shows a disk brake according to the prior art in a perspective plan view.

FIG. 1 shows a disk brake for a utility vehicle according to the prior art. Said disk brake comprises a brake caliper 1 which is held displaceably on a brake carrier 2, which can be fastened on the vehicle side, and in which brake caliper 1 two brake linings 3 which are arranged at a spacing from one another are mounted such that they can be moved in opposite directions.

Each brake lining 3 comprises a lining carrier plate 4 and a friction lining 5 which is fastened thereon, in each case one lining retaining spring 10 being fastened to the lining carrier plates 4, which lining retaining spring 10 is supported on a lining retaining bracket 11 which reaches over an assembly opening of the brake caliper 1 and by means of which the brake linings 3 are held under prestress in lining shafts of the brake carrier 2 which are delimited laterally by way of brake carrier horns 9.

In order to return the brake linings 3 into their non-functional position after a braking operation, a resetting device is provided which is formed from two spreading elements 6 which engage into the lining carrier plates 4 by means of spring legs 7 in the regions which are adjacent to the brake carrier horns 9.

On the other side, the spreading elements 6 are fastened to a retaining bracket 8 as a further constituent part of the resetting device, which holding bracket 8 is plugged with its two ends in each case into a brake carrier horn 9. This known disk brake is otherwise, as has already been mentioned, disclosed in WO 2016/202778 A1, to which reference is made expressly.

Figure 2:
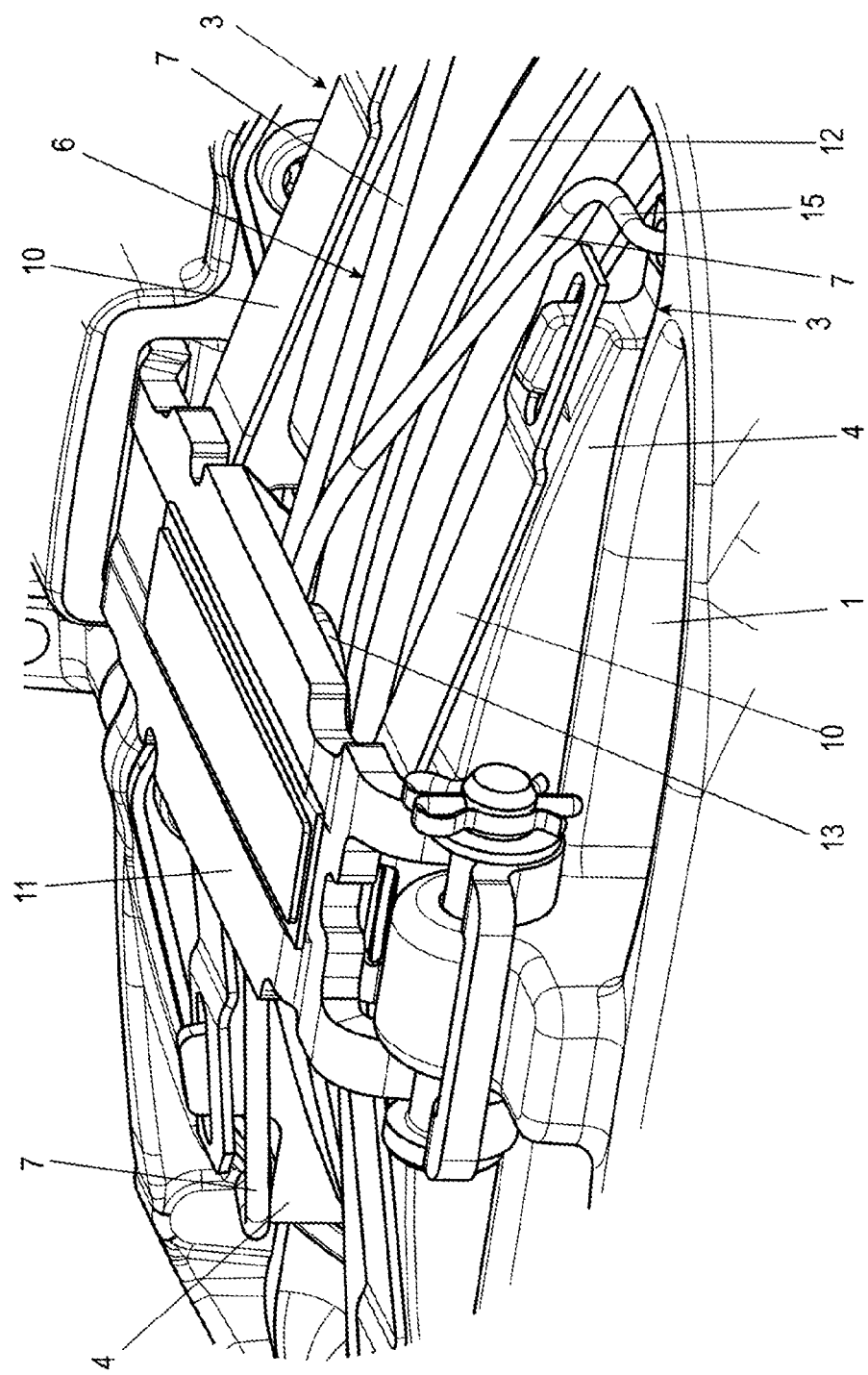
FIGS. 2 and 3 show a part detail of the disk brake according to an embodiment of the invention in a perspective view FIGS. 4 to 8 each show one design variant of the invention, in each case likewise in a perspective plan view.
Figure 3:
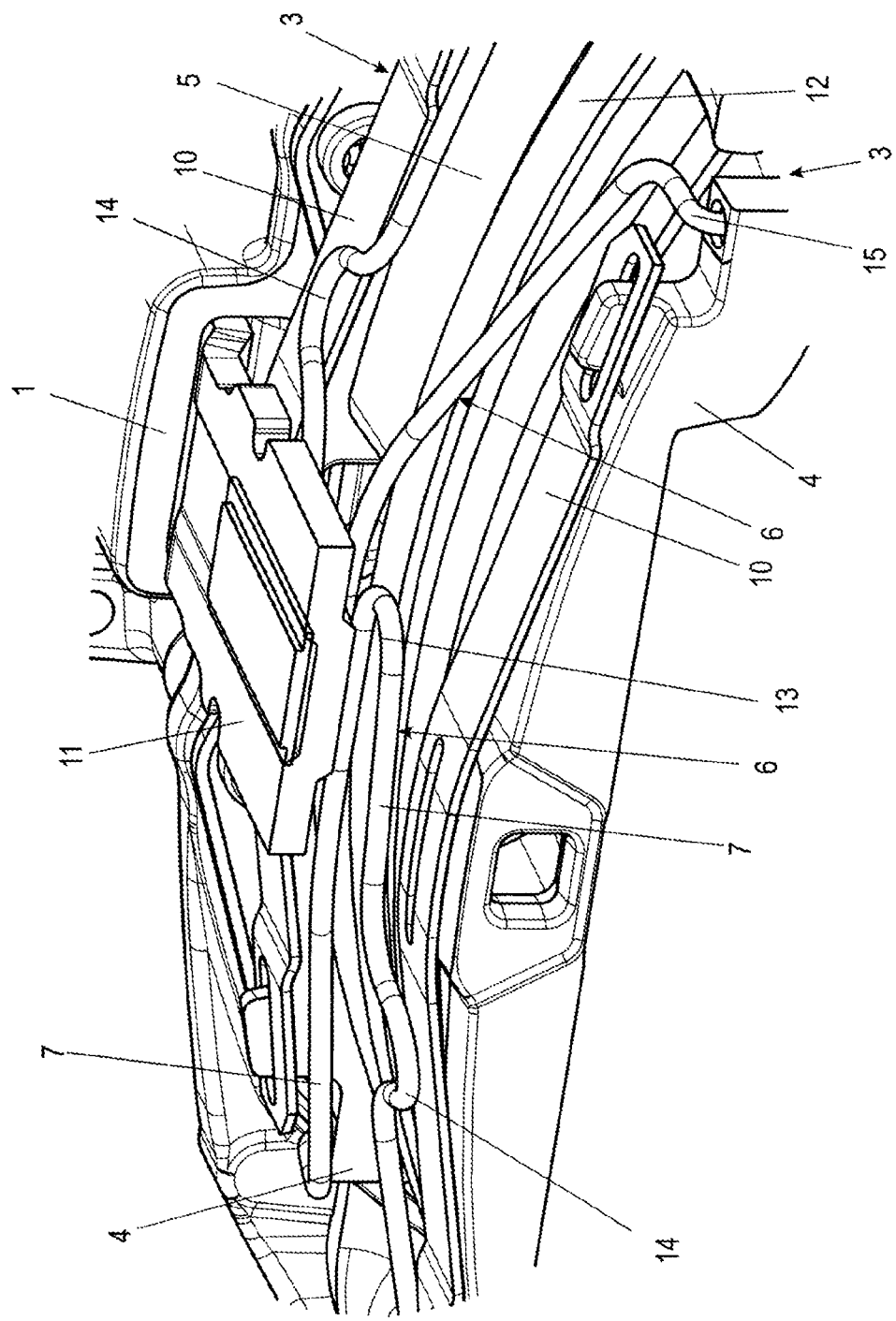

FIGS. 2 and 3 depict a part of a disk brake, in the case of which two V-shaped spreading elements 6 are provided according to the invention, which spreading elements 6 are supported in the connecting region 13 of their respective spring legs 7 on the lower side of the lining retaining bracket 11. Here, the spring legs 7 of each spreading element 6 are held by way of their ends 15 on the brake linings 3 which lie opposite one another, the ends 15 which are angled away with respect to the spring legs 7 being plugged into bores of the lining carrier plate 4 in the example according to FIGS. 2 and 3.

It can be seen in FIG. 3 that a support 14, shaped arcuately toward the outside in relation to a brake disk 12, of a spring leg 7 of the respective spreading element 6 lies on the lining retaining spring 10 of the associated brake lining 3, as a result of which tilting of the spreading element 6 is prevented.

FIGS. 4-8 depict the assembly of brake linings 3, spreading elements 6 and brake disk 12 on its own, that is to say without the brake caliper 1 and the lining retaining bracket 11. In this way, the configuration of the spreading elements 6 can be seen clearly.

Figure 4:
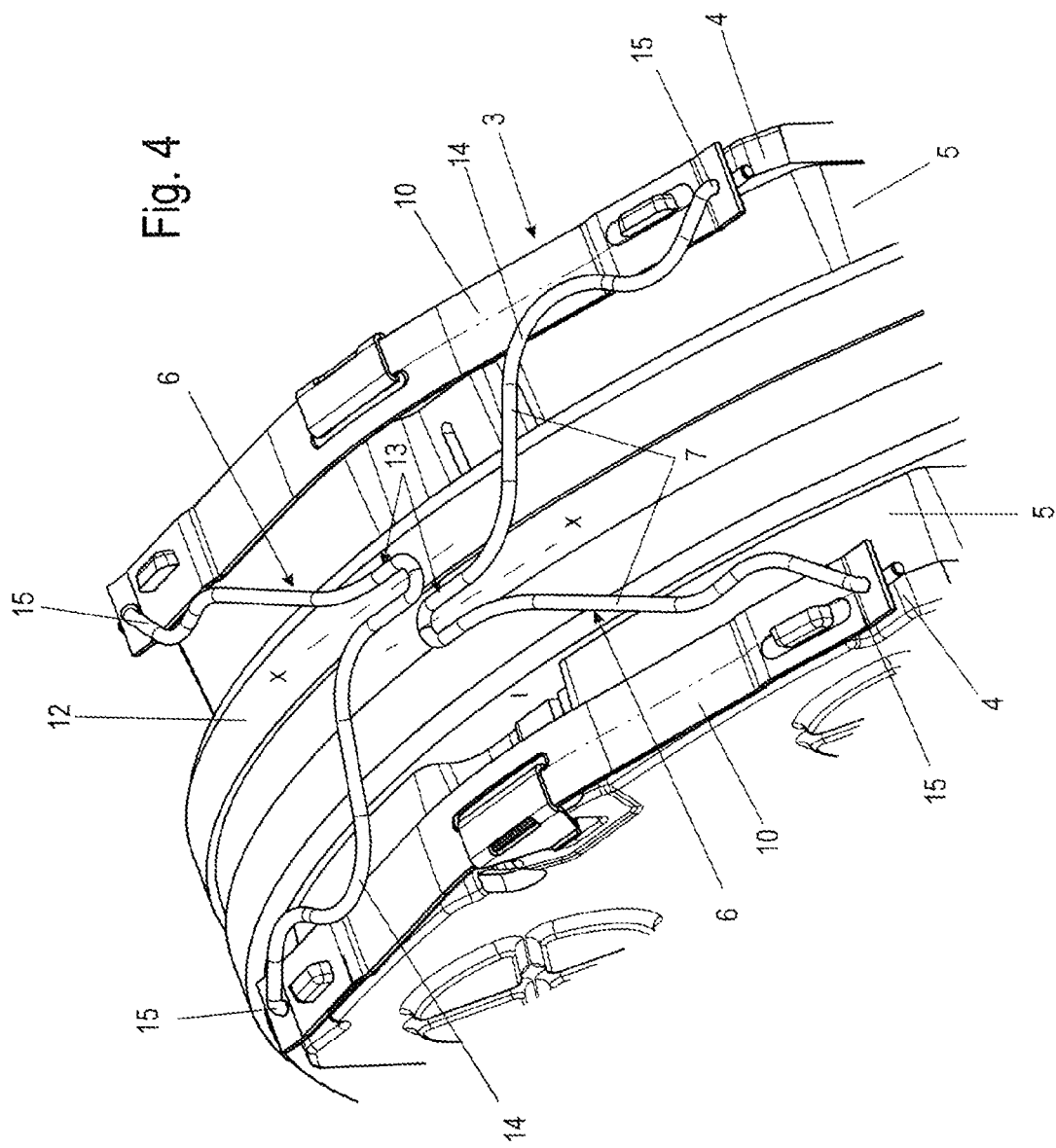

FIG. 4 therefore shows the embodiment of the spreading elements 6 according to FIG. 3. In contrast to this, however, they are not fastened directly to the lining carrier plate 4, but are rather in bores of the lining retaining springs 10.

It can be seen clearly that, in the case of the example which is shown in FIG. 4, the respective support 14 is configured merely on one side and bears against the associated lining retaining spring 10, the supports 14 of the two spreading elements 6 bearing against the lining retaining springs 10 of the brake linings 3 which lie opposite one another.

The two spreading elements 6 are in each case of asymmetrical configuration, in relation to an imaginary longitudinal axis X which is guided through the vertex of the connecting region 13, to be precise in such a way that, in the assembled position, the two connecting regions 13 of the spreading elements 6 are positioned offset with respect to one another, with a spacing of the longitudinal axes X from one another.

Figure 5:
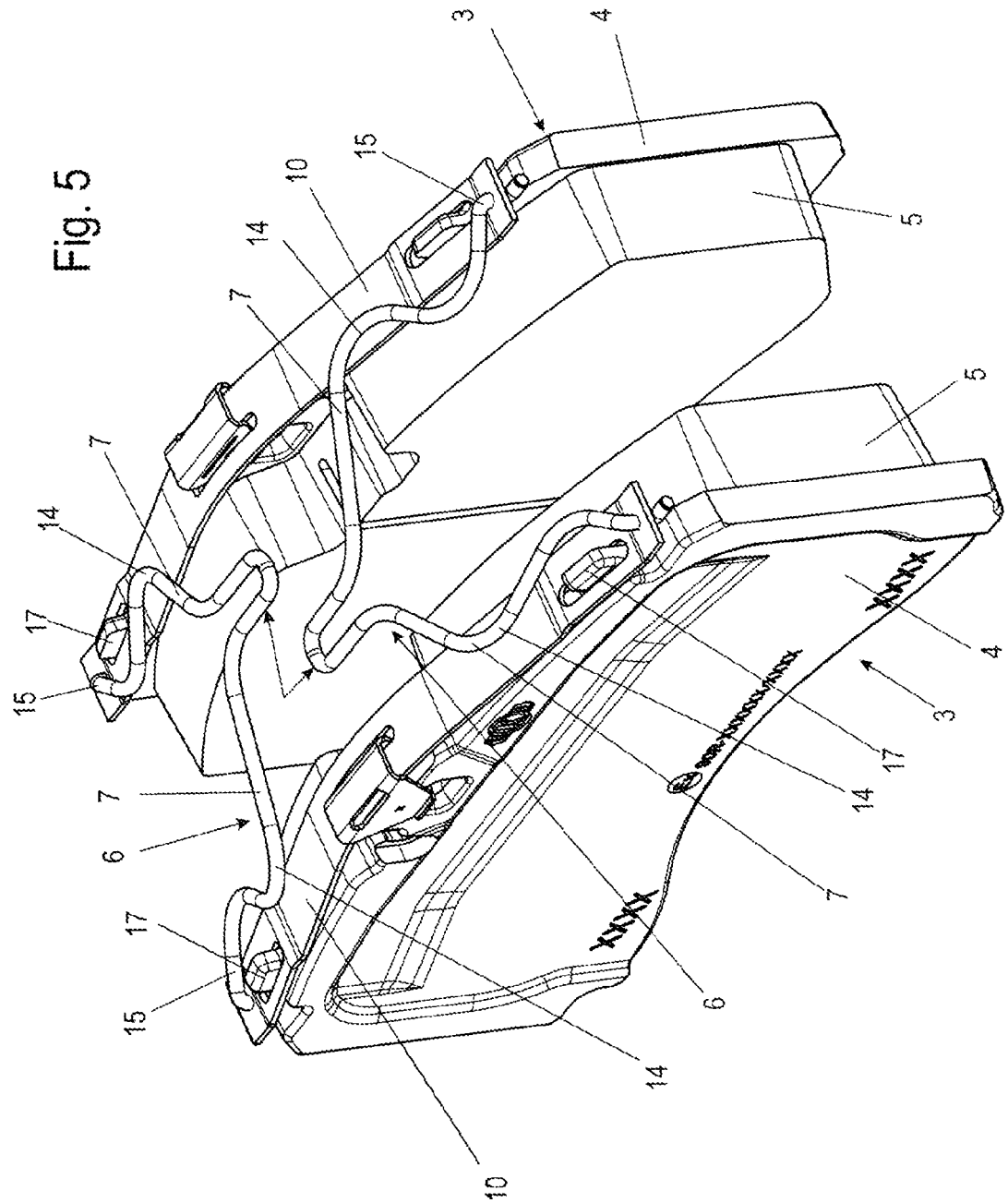

In the case of the example which is shown in FIG. 5, the ends 15 of the spring legs 7 are likewise plugged into bores of the lining retaining springs 10. In the case of this design variant, each spring leg 7 has a support 14 which bears against the associated lining retaining spring 10.

Figure 6:
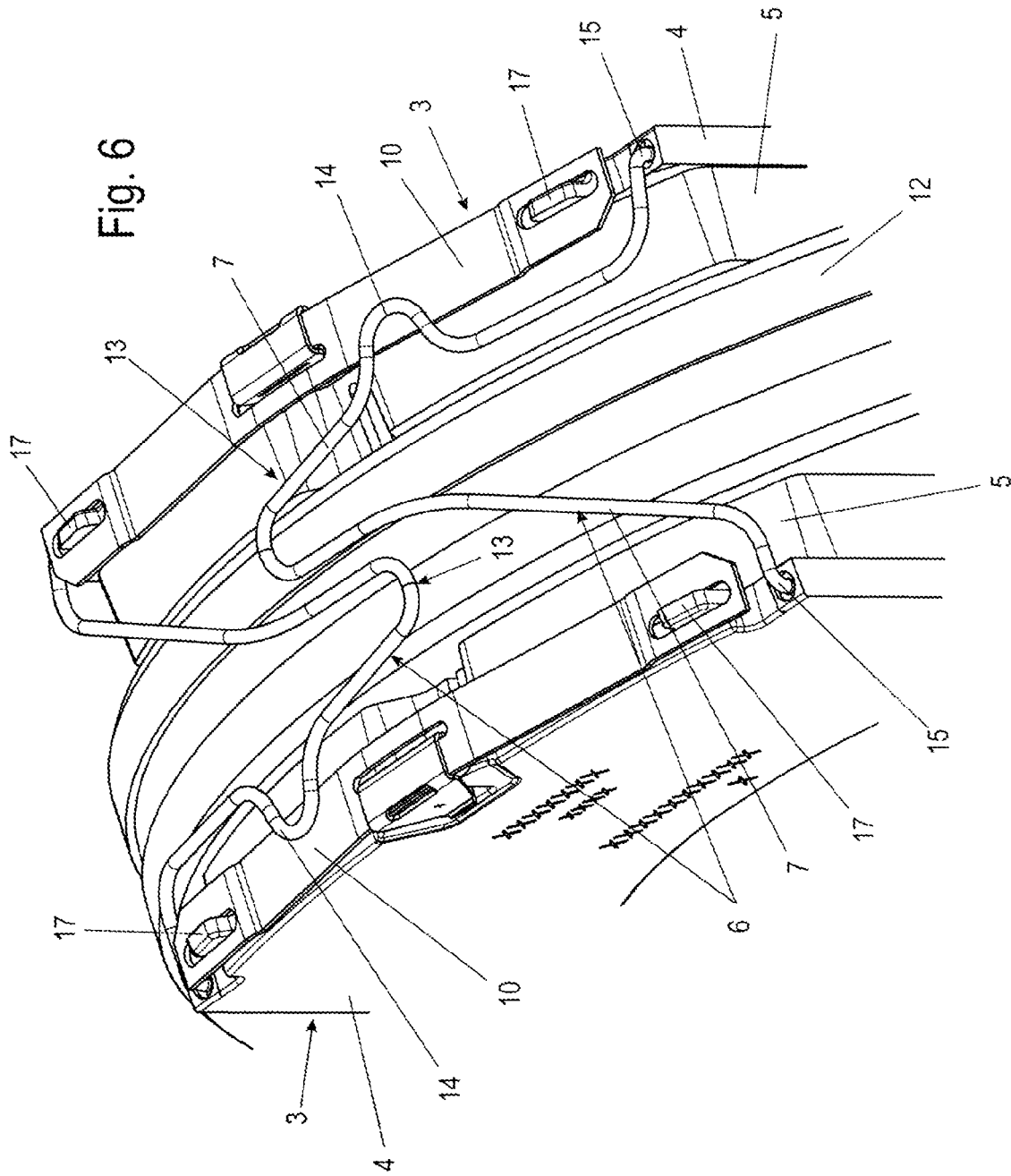

An embodiment of the spreading elements 6 which is comparable with FIG. 4 is depicted in FIG. 6, that is to say with merely in each case one support 14. However, the ends 15 of the spring legs 7 are plugged into bores of the lining carrier plate 4.

Figure 7:
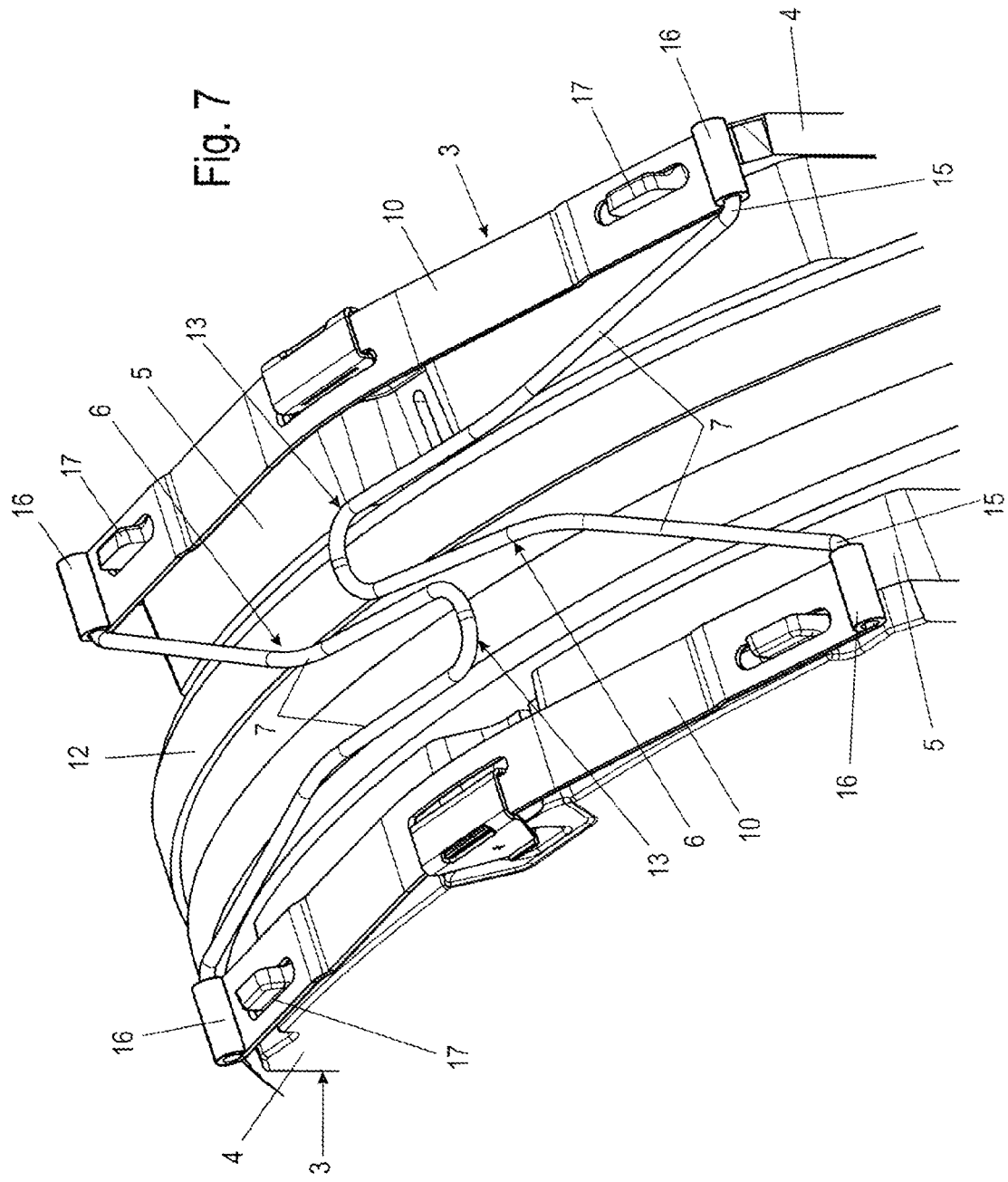

In the case of the exemplary embodiment which is shown in FIG. 7, the ends 15 of the spring legs 7 are plugged into eyelets 16 which are integrally formed on the respective lining retaining spring 10 on the end side, and are held captively therein, with the result that a support 14 can be dispensed with.

Figure 8:
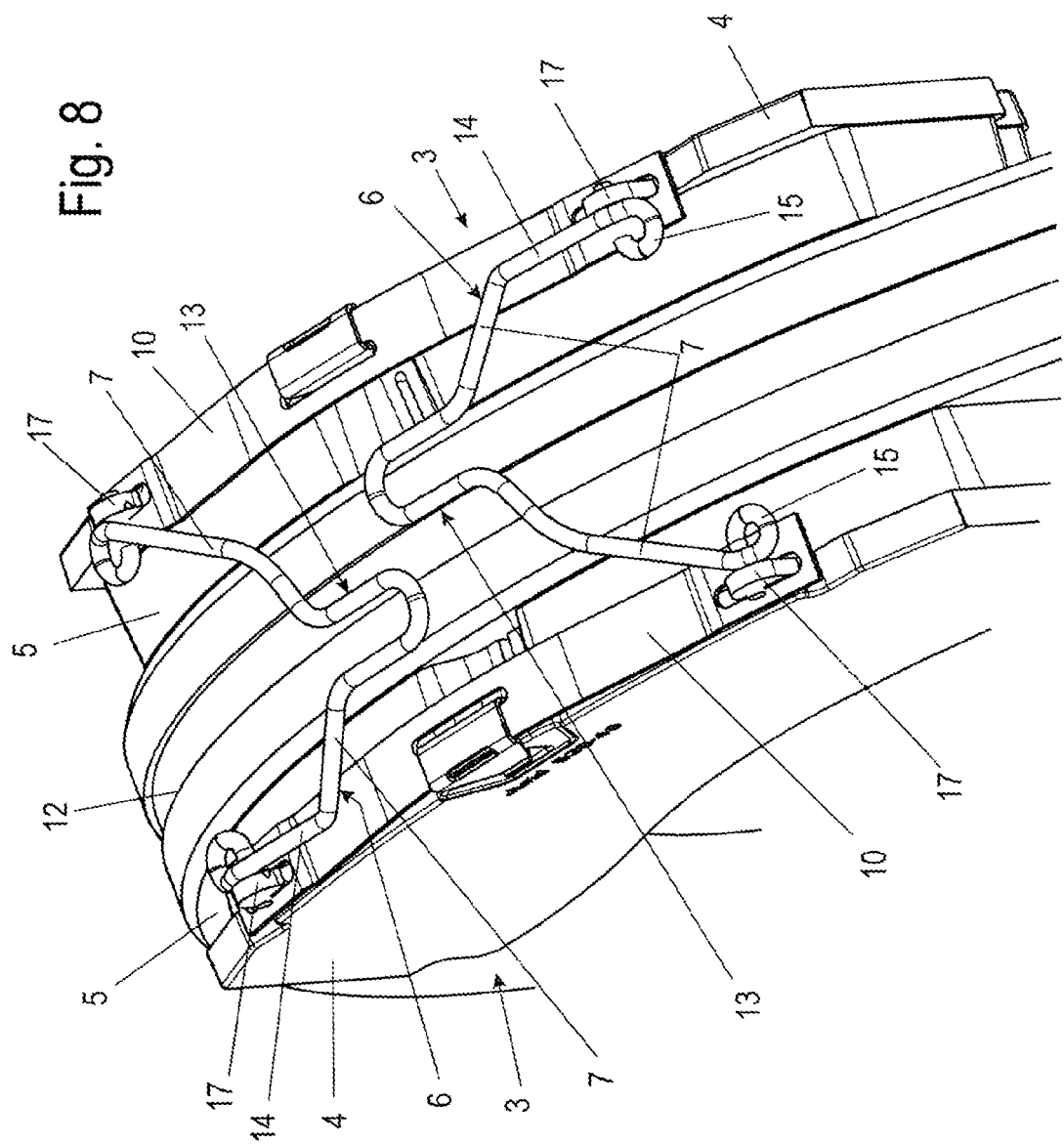

A further variant of the attachment of the spring legs 7 to the lining carrier plates 4 can be seen in FIG. 8. Here, the ends 15 are wound in such a way that a loop results which is guided above the lining retaining springs 10 through lugs 17 which are integrally formed on the respective lining carrier plate and pass through the lining retaining springs 10. Here, said ends 15 also serve to radially secure the lining retaining spring 10 with respect to the lining carrier plate 4.

Figure 9:
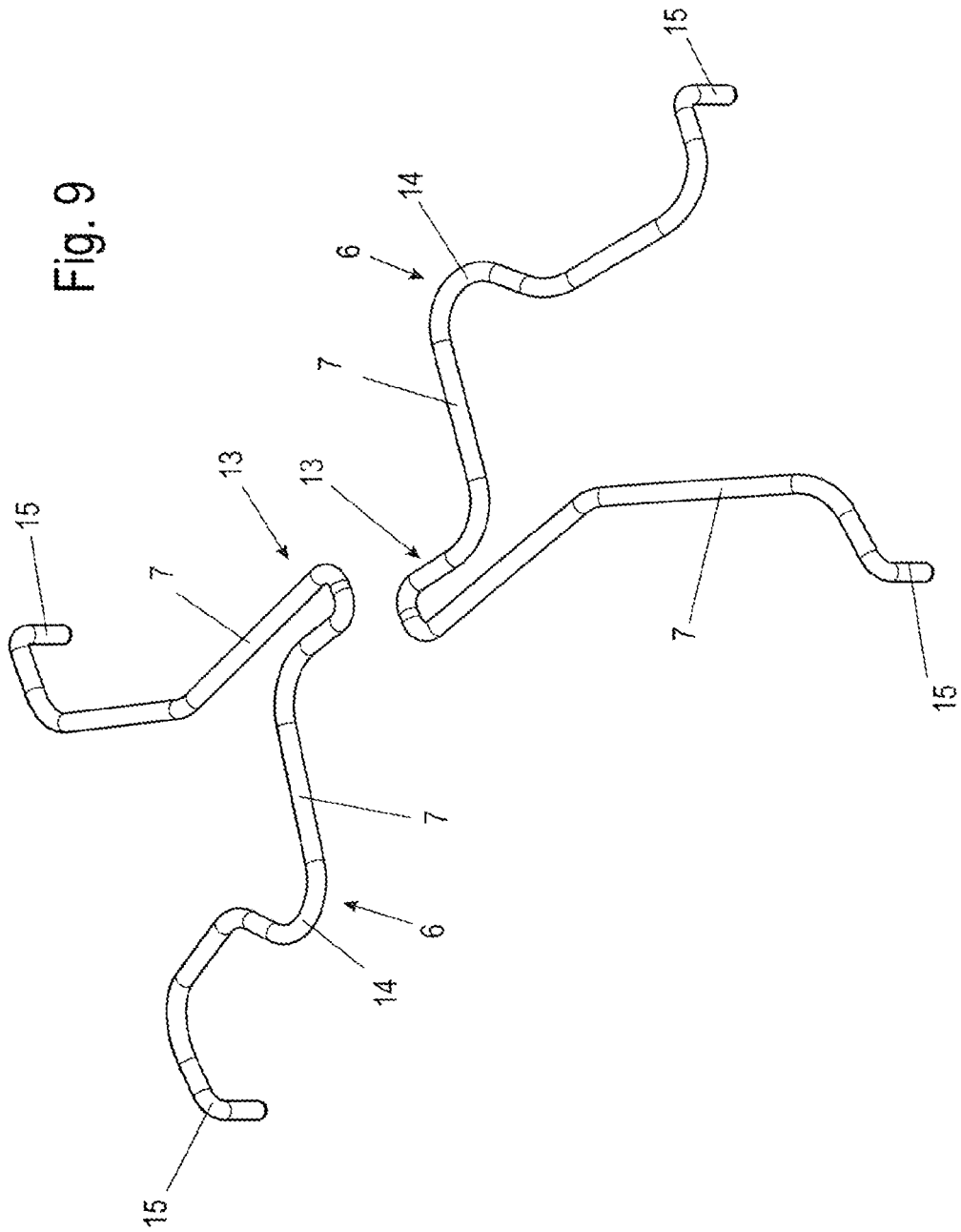
FIG. 9 shows a detail of an embodiment of the disk brake in a diagrammatic illustration.

FIG. 9 shows the spreading elements 6 as a detail, the supports 14 being configured on one side, that is to say on one of the two spring legs 7, in the case of this exemplary embodiment. Here, the ends 15 are otherwise formed at a right angle with respect to the spring legs 7.

Figure 10:
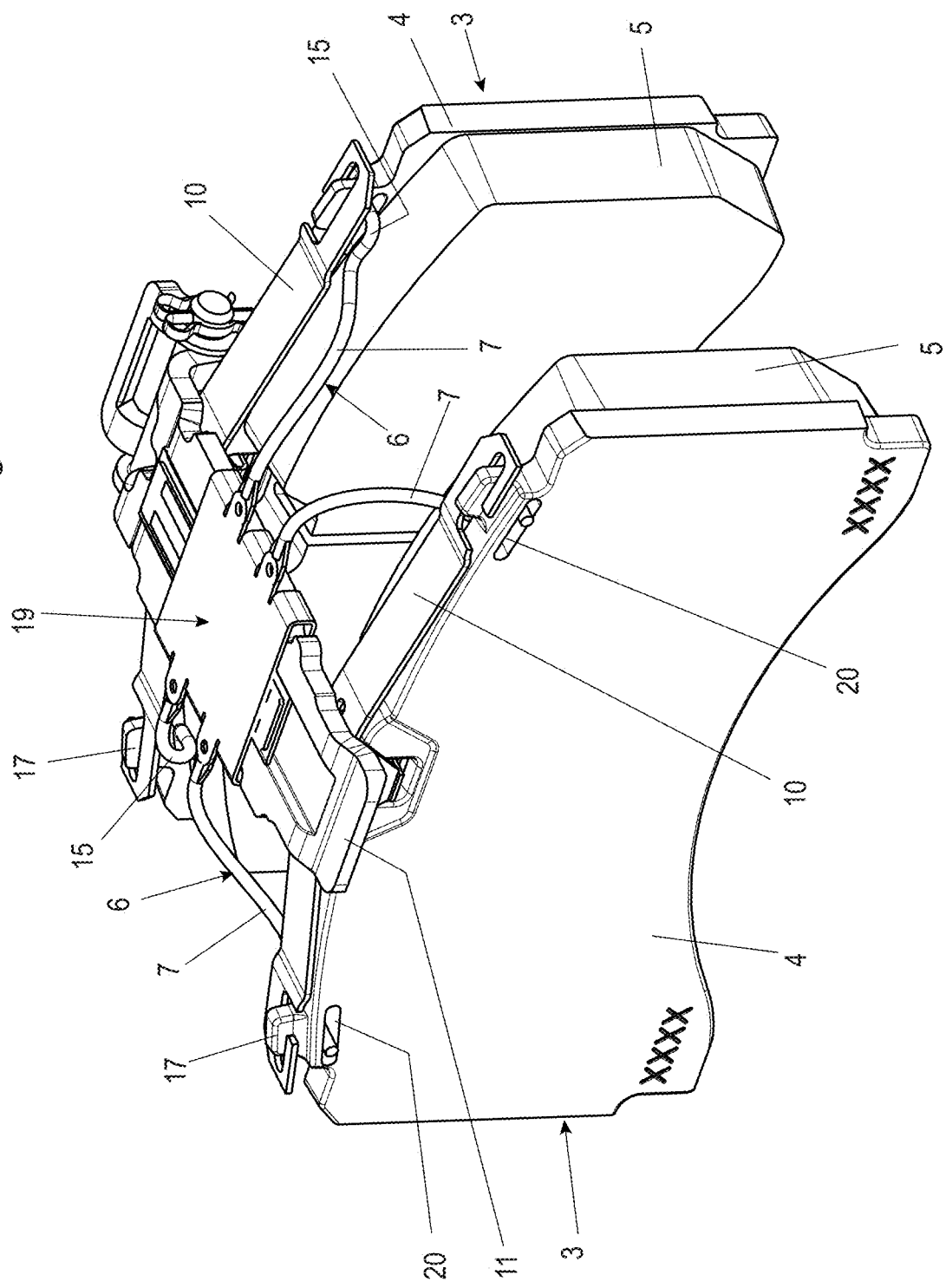
FIG. 10 shows an alternative embodiment of the invention in the mounted position of the spreading elements.

FIG. 10 shows an alternative embodiment of the holder of the spreading elements 6 on the lining retaining bracket 11. Here, the connecting regions 13 lie on the lining retaining bracket 11 and are fastened there by way of a clamping device 19, as a result of which the spreading elements 6 are prestressed in the radial direction in order to position them in a defined manner and in order to avoid noise as a result of vibrations. The clamping device 19 is preferably held such that it can be displaced axially, with the result that caliper movements are compensated for in the case of wear.

The ends 15 of the spring legs 7 are guided through slots 20 of the lining carrier plates 4, the ends 15 being angled away at a right angle in the plane of the course of the spring legs 7.

Figure 11:
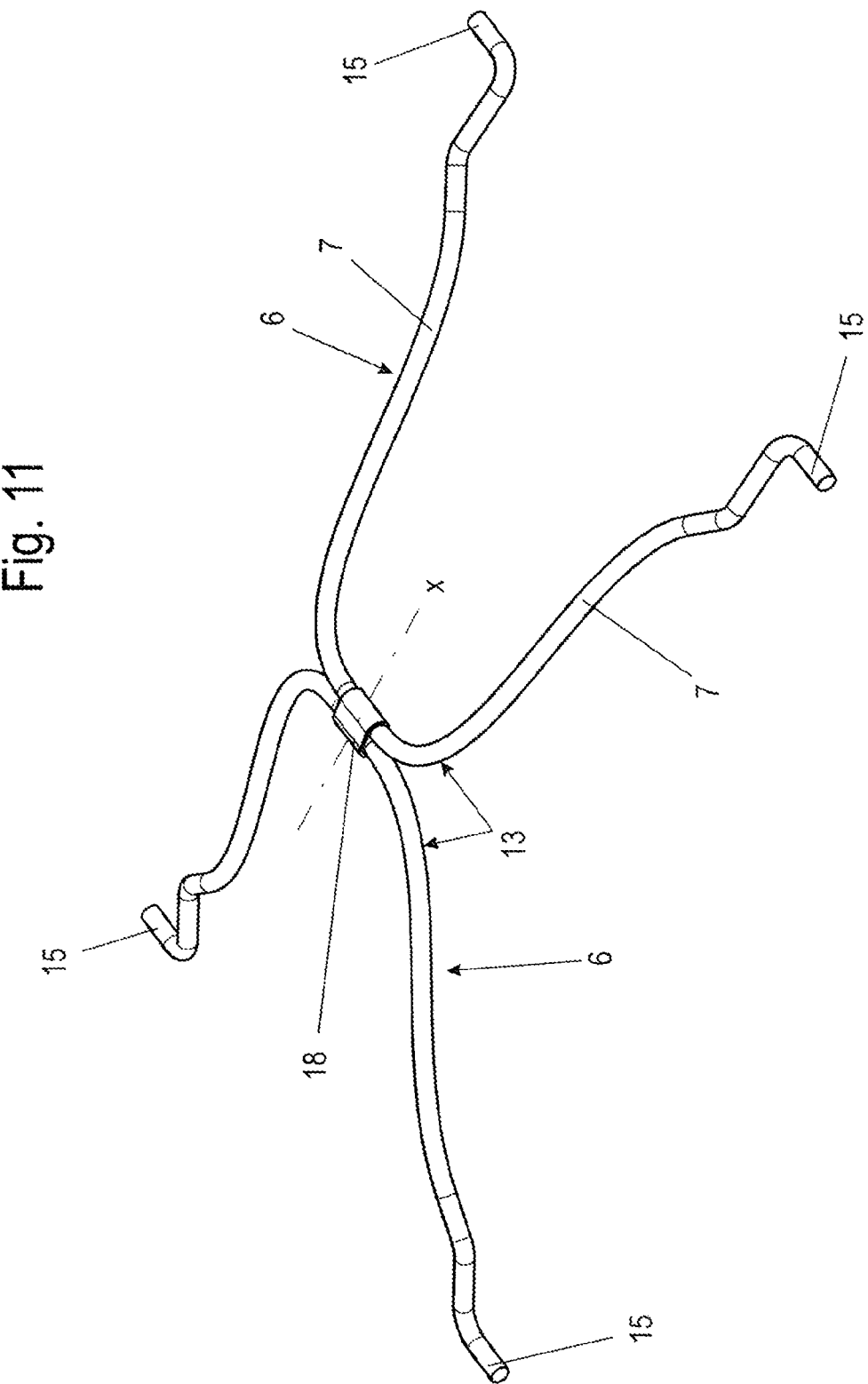
FIG. 11 shows a further embodiment of the spreading elements as a detail.

In the case of the further exemplary embodiment of the two spreading elements 6 which is shown in FIG. 11, they bear against one another by way of their connecting regions 13 and are connected to one another by way of a clip 18, the spreading elements 6 not being of asymmetrical configuration, but rather being of symmetrical configuration, in relation to the above-described longitudinal axis X.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS

1 Brake caliper
2 Brake carrier
3 Brake lining
4 Lining carrier plate
5 Friction lining
6 Spreading element
7 Spring leg
8 Retaining bracket
9 Brake carrier horn
10 Lining retaining spring
11 Lining retaining bracket
12 Brake disk
13 Connecting region
14 Support
15 End
16 Eyelet
17 Lug
18 Clip
19 Clamping device
20 Slot

The invention claimed is:

1. A disk brake for a utility vehicle, comprising:
a brake disc;
a brake caliper configured as a sliding caliper and to straddle the brake disk;
two brake linings arranged on opposite sides of the brake disc, each brake lining having a lining carrier plate and a friction lining on the lining carrier plate;
a brake carrier having brake carrier horns configured to abut respective sides of the two brake linings in a circumferential direction relative to a rotation axis of the brake disc;
a lining retaining bracket configured to be held on the brake caliper and span an assembly opening of the brake caliper;
a lining retaining spring on each of the two brake linings configured to cooperate with the lining retaining bracket to inhibit movement of the two brake linings away from the brake disc rotation axis; and
a resetting device having sprung spreading elements configured to bias the two brake linings away from one another and reset the two brake linings away from the brake disc after a displacement of the two brake pads toward the brake disc during a braking event,
wherein
the sprung spreading elements include two V-shaped spreading elements having spring legs which are supported on or fastened to the lining retaining bracket,
the spring legs of each of the two V-shaped spreading elements cooperate with both of the two brake linings such that the two brake linings are biased away from one another, and
each of the two V-shaped spreading elements includes a connecting region at a vertex of their V-shapes, wherein each of the connecting regions defines a longitudinal axis through the vertex, wherein the longitudinal axes are parallel and spaced apart in a direction parallel to the rotation axis of the brake disc, and wherein the two V-shaped spreading elements do not intersect each other.

2. The disk brake as claimed in claim 1, wherein
each of the V-shaped sprung spreading elements includes two spring legs, and
ends of the spring legs of each of the two V-shaped spreading elements are angled away from one another.

3. The disk brake as claimed claim 2, wherein
each spring leg end is located in a lug of a respective one of lining carrier plates of the two brake linings which passes through a slot of the respective lining retaining spring.

4. The disk brake as claimed in claim 3, wherein
each spring leg end is curved in a loop-shaped manner and is located in a bore of the lug.

5. The disk brake as claimed in claim 2, wherein
each spring leg end is located in a bore of the lining retaining spring.

6. The disk brake as claimed in claim 2, wherein
each spring leg end is located in a bore of a respective one of lining carrier plates of the two brake linings.

7. The disk brake as claimed in claim 2, wherein
each spring leg end is located in an integrally molded eyelet of the respective lining retaining spring.

8. The disk brake as claimed in claim 1, wherein
the connecting regions of the two V-shaped spreading elements lie against one another.

9. The disk brake as claimed in claim 8, wherein
the connecting regions are connected to one another.

10. The disk brake as claimed in claim 1, wherein
the connecting regions lie on the lining retaining bracket.

11. The disk brake as claimed in claim 10, wherein
the connecting regions are fastened to the lining retaining bracket by a clamping device.

12. The disk brake as claimed in claim 1, wherein
at least one spring leg has a support portion configured to extend over a respective one of the two brake linings in a direction parallel to the brake disc rotation axis.

13. The disk brake as claimed in claim 1, wherein
each of the V-shaped spreading elements is asymmetrical relative to the circumferential direction when in an installed position in the disk brake.

14. The disk brake as claimed in claim 1, wherein
each of the two V-shaped spreading elements are formed in one piece from a wire.

15. The disk brake as claimed in claim 1, wherein
the two V-shaped spreading elements are of mirror-symmetrical configuration when in their respective installed positions in the disk brake.

16. The disk brake as claimed claim 1, wherein
the connecting regions of the two V-shaped spreading elements are fastened to the lining retaining bracket.

\* \* \* \* \*